United States Patent
Redgate

Patent Number: 5,955,844
Date of Patent: Sep. 21, 1999

[54] SMART LOGIC SWITCHING UNINTERRUPTIBLE POWER SOURCE

[76] Inventor: Robert Redgate, Rte. 1, Box 44, Waynoka, Okla. 73860

[21] Appl. No.: 08/918,149
[22] Filed: Aug. 25, 1997
[51] Int. Cl.$^6$ .................................................. H05B 37/02
[52] U.S. Cl. .......................... 315/86; 315/130; 315/133; 315/316; 315/320
[58] Field of Search ............................. 315/86, 129, 130, 315/133, 307, 313, 316, 317, 320; 340/310.01

[56] References Cited

U.S. PATENT DOCUMENTS

| | | | |
|---|---|---|---|
| 4,418,333 | 11/1983 | Schwarzback et al. | 340/310 A |
| 4,703,306 | 10/1987 | Barritt | 340/310 |
| 5,471,114 | 11/1995 | Edwards et al. | 315/86 |
| 5,491,463 | 2/1996 | Sargeant et al. | 340/310.01 |
| 5,734,230 | 3/1998 | Edwards et al. | 315/86 |

Primary Examiner—David Mis
Attorney, Agent, or Firm—McAffe & Taft

[57] ABSTRACT

An uninterruptible power source for emergency lighting in an AC powered electrical system utilizes X-10 protocol transmitters and receivers for transmitting and receiving data signals over existing wiring to emergency wall switches interposed in the wiring for maintaining emergency lighting in the on condition when AC commercial power is interrupted and a battery powered backup unit converting DC to AC is activated upon the interruption of the commercial AC source.

4 Claims, 1 Drawing Sheet

SMART LOGIC SWITCHING UNINTERRUPTIBLE POWER SOURCE

CROSS REFERENCE TO RELATED APPLICATIONS

Not applicable.

STATEMENT REGARDING FEDERALLY SPONSORED RESEARCH OR DEVELOPMENT

Not applicable.

This invention relates to lighting systems and more particularly to a backup power source utilizing existing wiring in the event of loss of commercial power.

BACKGROUND OF THE INVENTION

It is essential in commercial establishments such as manufacturing plants, high rise office buildings, hospitals and the like, that emergency lighting be provided in the event of interruption of commercial power. In areas of manufacturing facilities where loss of lighting and commercial power results in necessary shut down of equipment, requiring the evacuation of personnel, sufficient emergency lighting must be provided to enable personnel to safely leave the facilities. This invention provides a fail safe electric light emergency system utilizing existing wiring and known code transmission and receiving protocol to accomplish the above desired results.

BRIEF SUMMARY OF THE INVENTION

An uninterruptible emergency power supply is connected with any commercial AC supply circuit at the breaker panel. The emergency power supply is switched on through a nanosecond switch in response to interruption of the commercial AC power. The system further includes batteries, an inverter, a logic code oscillator/transmitter and code receivers within emergency wall switches installed at selected locations in existing wiring for receiving logic transmission.

The emergency wall switch includes a normally open secondary switch, connected in parallel with a wall switch, relay closed to bypass the wall switch in response to a code received by the logic receiver.

The principal objects of this invention are to provide an emergency power backup system which utilizes existing wiring downstream from a breaker panel for turning on emergency lights or signals and monitoring the presence or absence of personnel in building egress positions; which maintains a minimum of lighting when the egress routes are vacant and turns off the emergency lights or alarms when commercial line voltage is restored; and to provide an improved wall switch which permits operation of components connected with existing wiring by current control circuitry connected with the building wiring and accessed from a remote location.

DESCRIPTION OF THE PREFERRED EMBODIMENTS

Figure 1:
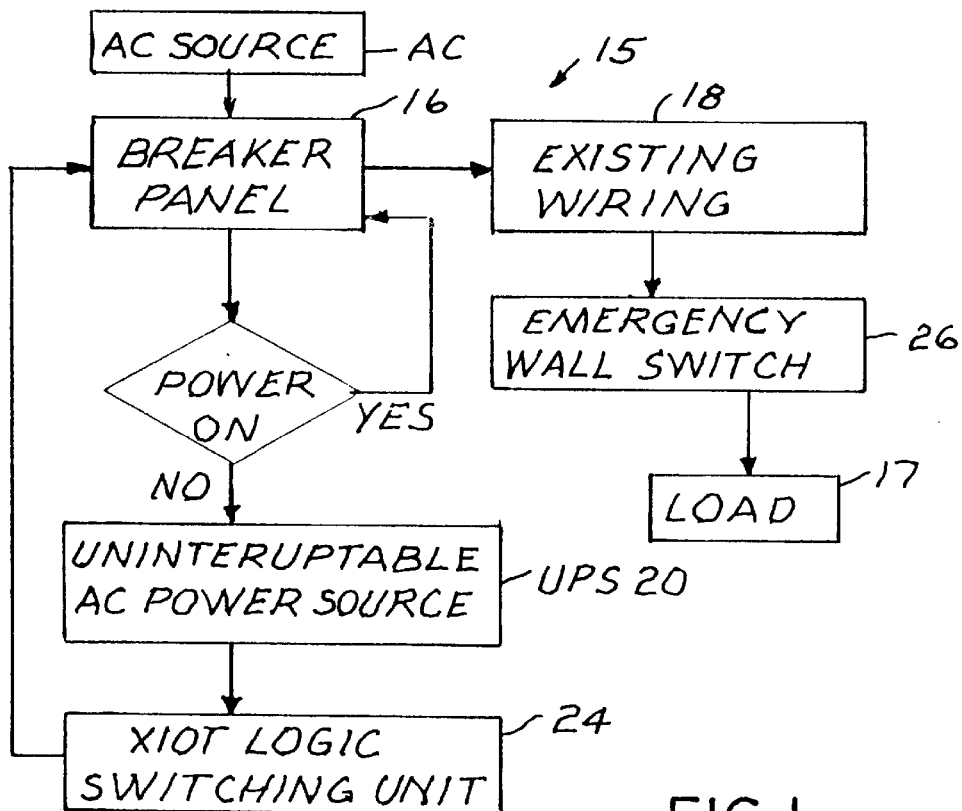
FIG. 1 is a flow diagram of the system.

Like characters of reference designate like parts in those figures of the drawings in which they occur.

In the drawings:

This AC emergency backup electrical system utilizes data protocol known as the X-10 protocol which was developed by Pico Electronics of Fife, Scotland. These products are distributed in the United States by X-10 (U.S.A.) Inc., of Northvale, N.J. 07647. The X-10 protocol utilizes an X-10 receiver (X-10R) electronic switch interposed in the wiring in an electrical wall switch location. The receiver is turned on and off by data transmitted over electrical wires from an X-10 transmitter (X-10T) energizing and de-energizing the receiver X-10R. The transmission of data from the transmitter to the receiver is synchronized with the zero crossing of AC sine wave and the data transmitted comprises a series of four bits as a start code (1110). In this invention an eleven bit code sequence is used for the transmission of data controlling the receiver.

Referring to the flow chart 15 a source of alternating current AC is connected with a breaker panel 16 for supplying electrical power to components, such as electrical lighting 17, connected with existing wiring 18.

A conventional uninterruptible AC power source (UPS) 20 is connected with the breaker panel 16 for supplying AC in the event of current interruption. The backup AC power source 20 may be obtained from American Power Conversion Inc., 132 Fair Grounds Road, West Kingston, RI. 02892. The UPS 20 includes a nanosecond switch, batteries and an inverter, none of which are shown. Upon interruption of commercial AC power for more than three or four nanoseconds the UPS 20 converts battery potential to at least 100 volts AC sine wave applied to the existing wiring 18 through a logic switching unit 24 and the breaker panel 16.

Figure 3:
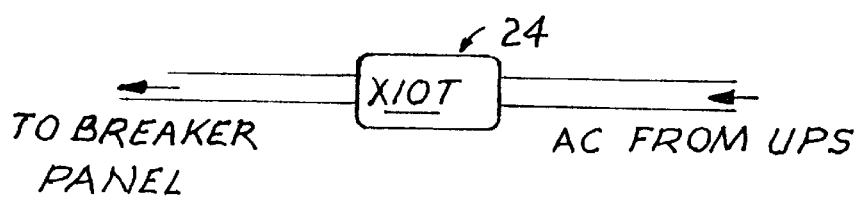
FIG. 3 is a wiring diagram.

The logic switching unit 24 includes a modified X-10 transmitter, X-10T (FIG. 3) preferably model A, for transmitting a code, using the X-10 protocol, through the breaker panel 16 and existing wiring 18 to trigger logic controlled switches and emergency lighting wall switches 26.

Figure 2:
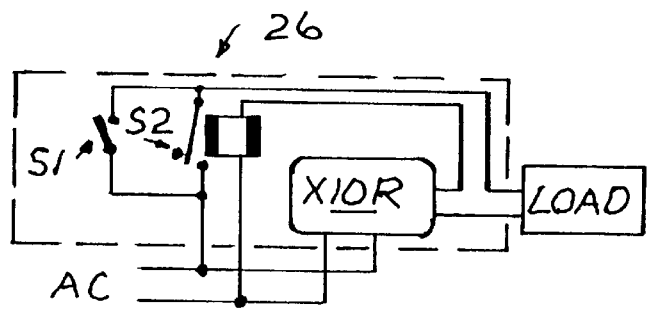
FIG. 2 is a wiring diagram of an emergency wall switch.

Referring more particularly to FIG. 2 the emergency wall switch 26 comprises a primary switch S1 interposed in the hot AC source wire to emergency lighting 17. A relay R, including a normally open switch S2, is connected in parallel with the primary switch S1 through a modified X-10 receiver X-10R interposed between the AC source and the emergency lighting 17 for controlling the on/off position of the switch S2. The transmitter X-10T signals the receiver X-10R to energize the relay R and close the switch S2 to turn on the emergency lights 17, if not on, and to stay on regardless of the position of the switch S1.

The X-10 receiver is modified to comply with the Underwriters Laboratories Code which states that a light turned on during power outage cannot be turned off by a switch or other conventional methods.

Obviously the invention is susceptible to changes or alterations without defeating its practicability. Therefore, I do not wish to be confined to the preferred embodiments shown in the drawings and described herein.

I claim:

1. In combination with a primary source of AC normally supplying current to an electrical system, including wiring and emergency lighting, through a breaker panel, the improvement comprising;

a normally inactive uninterruptible power supply unit connected with the primary source of AC for supplying AC to said electrical wiring system through said breaker panel when the primary source of AC power is interrupted;

an X-10 transmitter interposed between the uninterruptible power supply and the breaker panel for transmitting an X-10 protocol preprogrammed code signal over said electrical wiring when the primary source of AC is interrupted; and;

emergency wall switch means including an X-10 receiver interposed in the electrical wiring system adjacent said emergency lighting and responsive to said transmitter code signal for closing a switch maintaining said emergency lighting on while said primary source of power is interrupted.

2. The combination according to claim 1 in which said emergency wall switch further includes;

primary switch means interposed in said wiring system for normally controlling the off/on condition of said emergency lighting; and;

normally open secondary switch means interposed in said wiring in parallel with said primary switch means.

3. The combination according to claim 2 in which said secondary switch means comprises a relay.

4. Emergency switch means for an electrical wiring system including emergency lighting:

primary switch means adapted to be interposed in said wiring system for controlling the on/off position of said emergency lighting;

normally open relay switch means interposed in said wiring in parallel with said primary switch means; and, X-10 protocol receiver means responsive to X-10 protocol code signals connected with said wiring and said relay switch means for maintaining said relay switch means closed in response to an X-10 code signal.

* * * * *